US006364655B1

(12) United States Patent
Wang

(10) Patent No.: US 6,364,655 B1
(45) Date of Patent: Apr. 2, 2002

(54) ARM STRUCTURE FOR AN INJECTION MOLDING MACHINE

(75) Inventor: Jui-Hsiang Wang, Yung Kang (TW)

(73) Assignee: Hwa Chin Machinery Factory Co., Ltd., Tainan Hsien (TW)

( * ) Notice: Subject to any disclaimer, the term of this patent is extended or adjusted under 35 U.S.C. 154(b) by 0 days.

(21) Appl. No.: 09/552,664

(22) Filed: Apr. 19, 2000

(51) Int. Cl.⁷ ............................................... B29C 45/66
(52) U.S. Cl. ................................... 425/589; 426/593
(58) Field of Search ........................ 425/589, 592, 425/593, 451.5, 451.6

(56) References Cited

U.S. PATENT DOCUMENTS 4,088,432 A  *  5/1978  Farrel ........................ 425/593
4,545,757 A  * 10/1985  Romi ......................... 425/593

* cited by examiner

Primary Examiner—Tim Heitbrink
(74) Attorney, Agent, or Firm—Rosenberg, Klein & Lee

(57) ABSTRACT

An arm structure for an injecting molding machine includes a first arm, a second arm, a third arm and an oil pressure cylinder. The cylinder is positioned between a receiving disc and a movable mold base. The second arm and the third arm consist of plural pivotal plates located separately at two sides of the cylinder with a distance a little larger than the outer diameter of the cylinder. Further, the space between the two joints of the second arm and the third arm is a little larger than the outer diameter of the cylinder. So the two joints of the second and the third arms can pass the cylinder without colliding with the cylinder when the arm structure operates to move back and forth in opening and closing the mold. Thus, the size of an injecting molding machine is reduced to save transporting and packaging cost and needed space for installation.

1 Claim, 5 Drawing Sheets

ARM STRUCTURE FOR AN INJECTION MOLDING MACHINE

BACKGROUND OF THE INVENTION

This invention relates to an arm structure for an injecting molding machine, particularly to one moved by an oil pressure cylinder injecting molding machine positioned between a receiving disc and a movable mold base, never colliding with the oil pressure cylinder when the arm structure retreats inward.

A common known conventional arm-style injecting molding machine includes an arm structure 30 as shown in FIG. 5, pivotally connected between a movable mold base 10 and a receiving disc 20. The arm structure includes a first arm 301, a second arm 302, and a third arm 303 mutually and pivotally connected with each other. Further, the first arm 301 is pivotally connected onto a cress-shaped head 304 and then also pivotally connected to the second arm 302, which has one end pivotally connected to the receiving disc 20 and the other end pivotally connected to the third arm 303. The other end of the third arm 303 is pivotally connected to the movable mold base 10. The oil pressure cylinder 40 fixed on the receiving disc and extending outward has its piston rod 401 connected firmly on the cross-shaped head 304. Then the oil pressure cylinder 40 operates to move the movable mold base 10 to open and close the mold.

However, as the oil pressure cylinder 40 extends out of the machine body, it takes a large space whether in transporting or installing, especially in installing, the oil pressure cylinder occupies a large space of a factory, causing a problem in arranging working place and the injecting molding machine. So, some makers have tried to position the oil pressure cylinder for moving the arm structure between the receiving disc and the movable mold base. However, the space between the receiving disc and the movable mold base is limited so the pivotal joint of the second arm collides with the oil pressure cylinder body extending in the receiving disc when the arm structure retreats inward. Besides, a smaller oil pressure cylinder cannot be used because of mold closing force being not enough, in order to avoid operating radius of the joint of the second arm.

SUMMARY OF THE INVENTION

The invention has been devised to offer an arm structure for an injecting molding machine, having an oil pressure cylinder positioned between the receiving disc and the movable mold base. A second arm and a third arm are formed with plural pivotal plates, which are pivoted with the fix plate of the receiving disc and the movable mold base. The two inner pivotal plates of the second arm are located in the two sides of the cylinder with a space a little larger than the outer diameter of the oil pressure cylinder. In addition, the space between the two joints pivotally connected between the second and the third arms are also a little larger than the outer diameter of the coil pressure cylinder. Therefore, The joints between the second and the third arm can pass through without colliding with the oil pressure cylinder, when the arm structure retreats, in opening the mold and subsequently closing the mold. Thus, the oil pressure cylinder can be positioned inside the receiving disc, reducing the dimensions of an injecting molding machine for transportation and installation of the injecting and molding machine.

BRIEF DESCRIPTION OF THE DRAWINGS

This invention will be better understood by referring to the accompanying drawings, wherein.

DETAILED DESCRIPTION OF THE PREFERRED EMBODIEMNT

Figure 1:
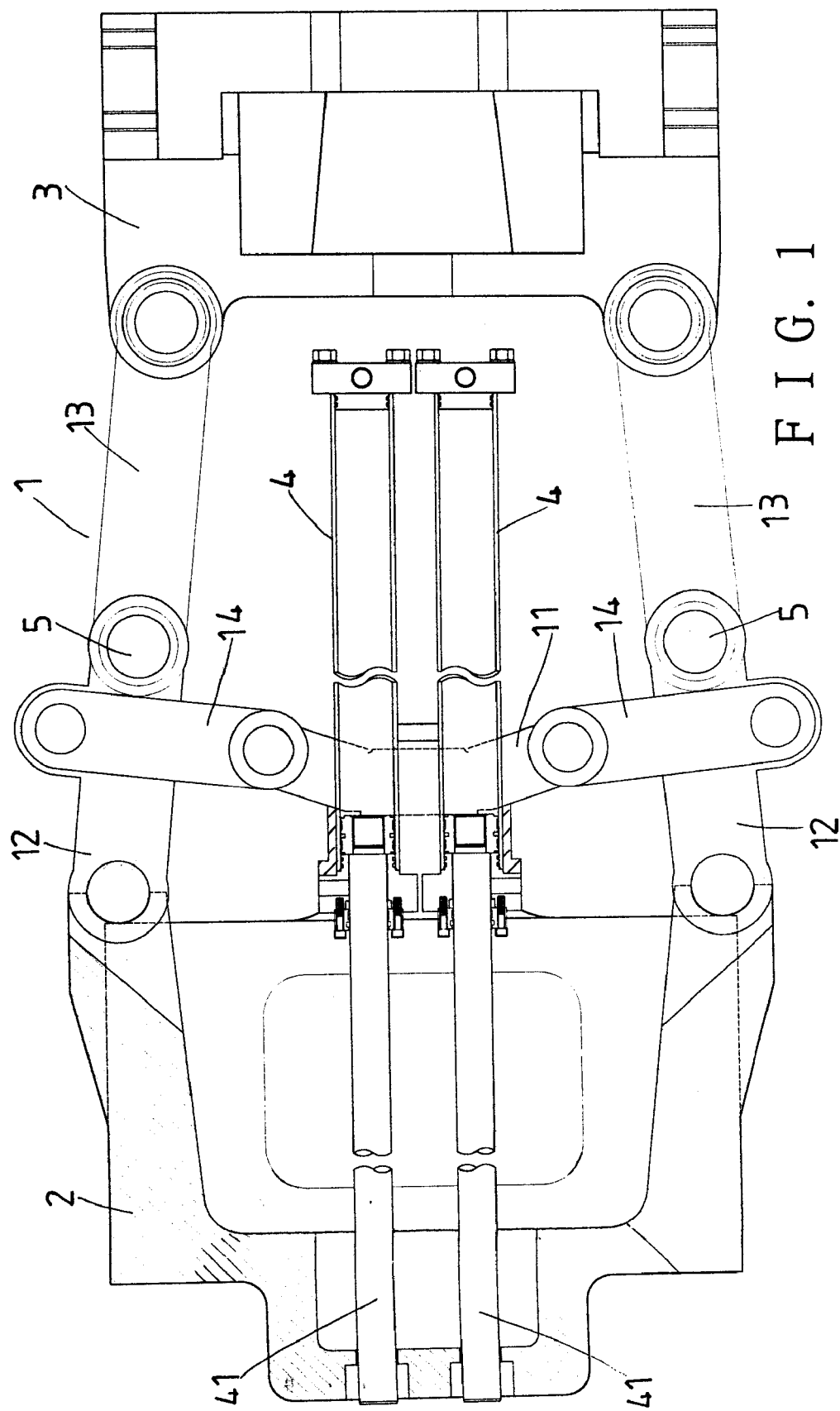
FIG. 1 is a front view of an arm structure for an injecting molding machine of the present invention.
Figure 2:
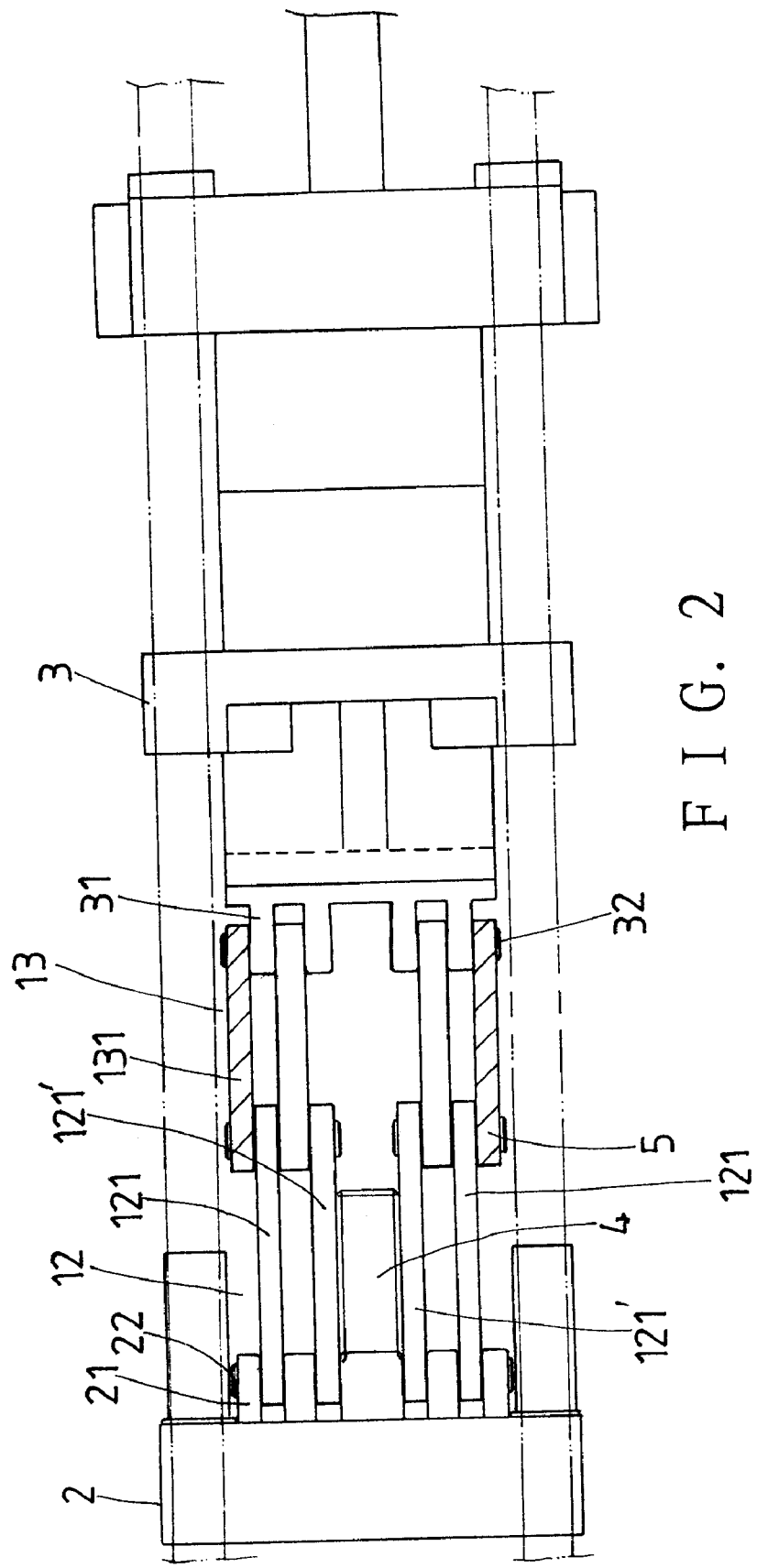
FIG. 2 is an upper view of the arm structure for an injecting molding machine of the present invention.
Figure 3:
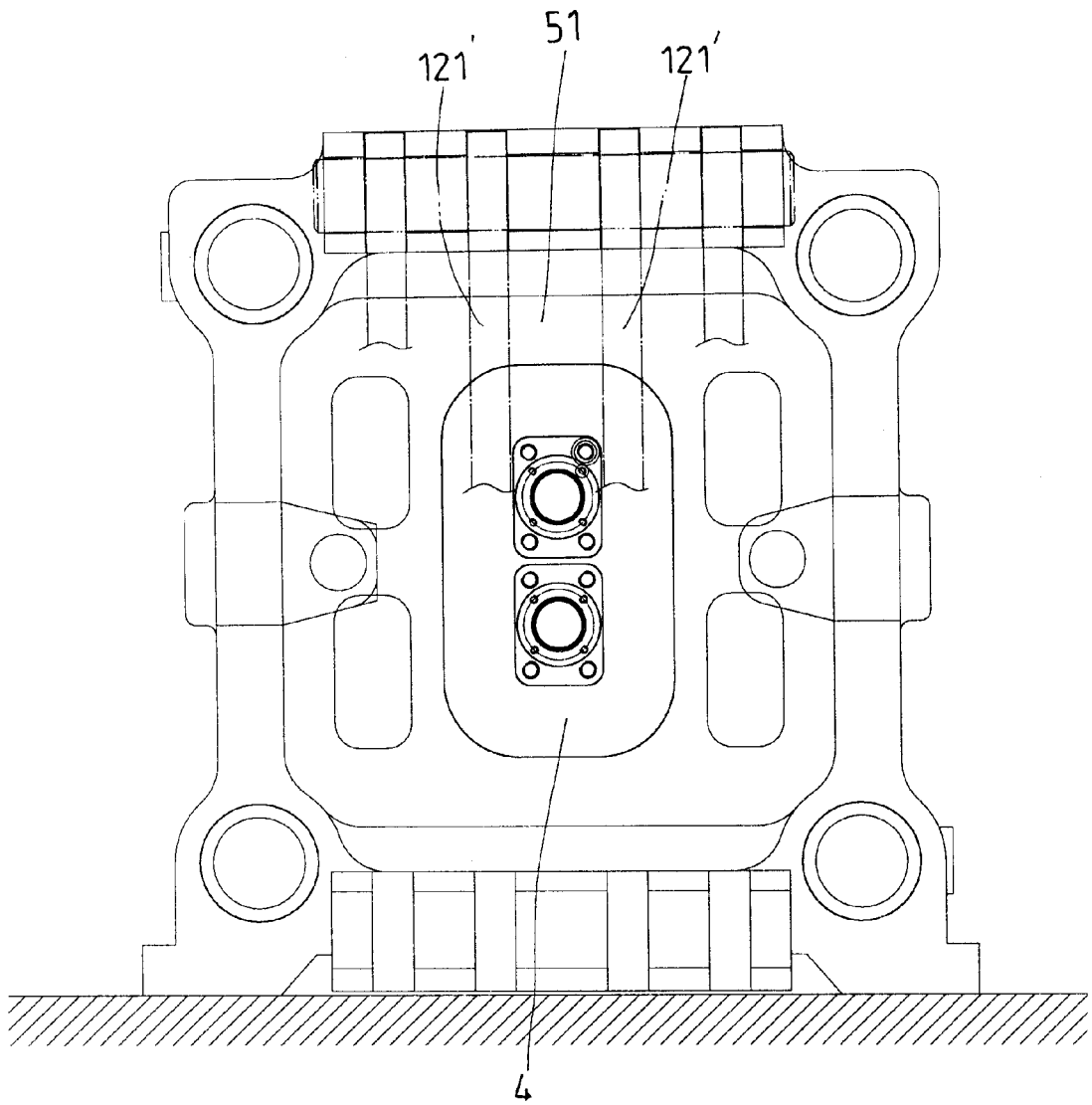
FIG. 3 is a side view of the arm structure for an injecting molding machine of the present invention.

A preferred embodiment of an arm structure for an injecting molding machine of the present invention, as shown in FIGS. 1, 2 and 3, is pivotally connected between a receiving disc 2 and a movable mold base 3, including an oil pressure cylinder 4 to move the arm structure 1. The oil pressure cylinder 4 is fixed on a cross-shaped head 11 of the arm structure 1, having its piston rod 41, and the end of the piston rod 41 is firmly fixed on the receiving disc 2. So when the oil pressure cylinder 4 pushed the piston rod 41 to move back and forth, the arm structure 1 is moved to move the movable mold base 3 for opening and closing the mold. The receiving disc 2 and the movable mold base 3 are pivotally connected to a second and a third arm 12 and 13 of the arm structure 1 by means of plural fix plates 21, 31. The second and the third arm 12 and 13 are composed of plural pivotal plates 121, 131, and pivots 22, 32 pass respectively through the pivotal plates 121 and 131 and pivotally connect respectively to the receiving disc 2 and the movable mold base 3. The two inner pivotal plates 121' of the second arm 12 located just above and at two sides of the oil pressure cylinder 4 (the center portion shown in FIG. 3) is separated with a space a little larger than the outer diameter of the oil pressure cylinder 4. Moreover, a space 51 is formed between the two joints 5 of the second and the third arms, having a little larger distance than the size of the oil pressure cylinder 4.

Figure 4:
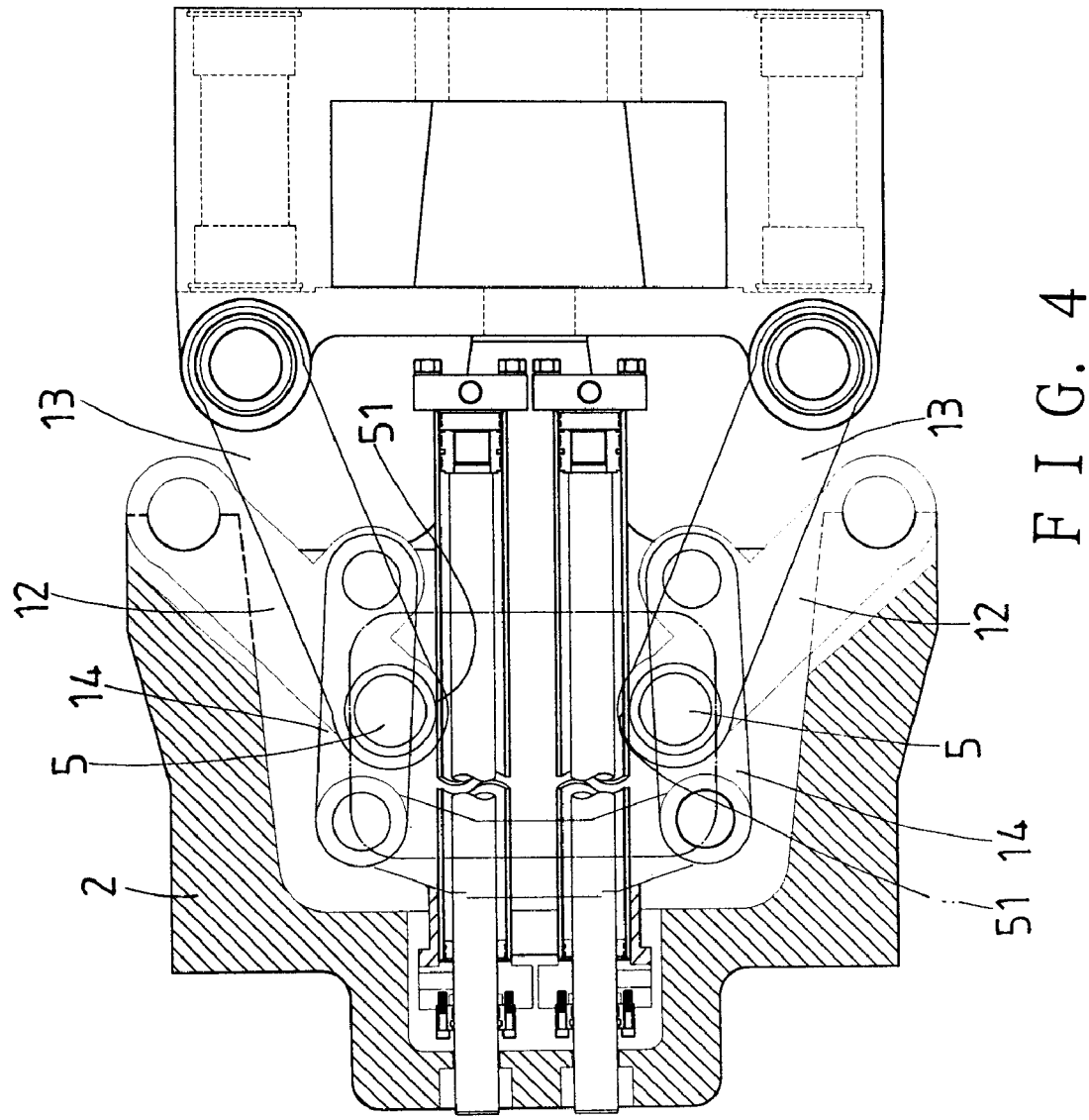
FIG. 4 is a front view of the arm structure retreating back of the present invention.
Figure 5:
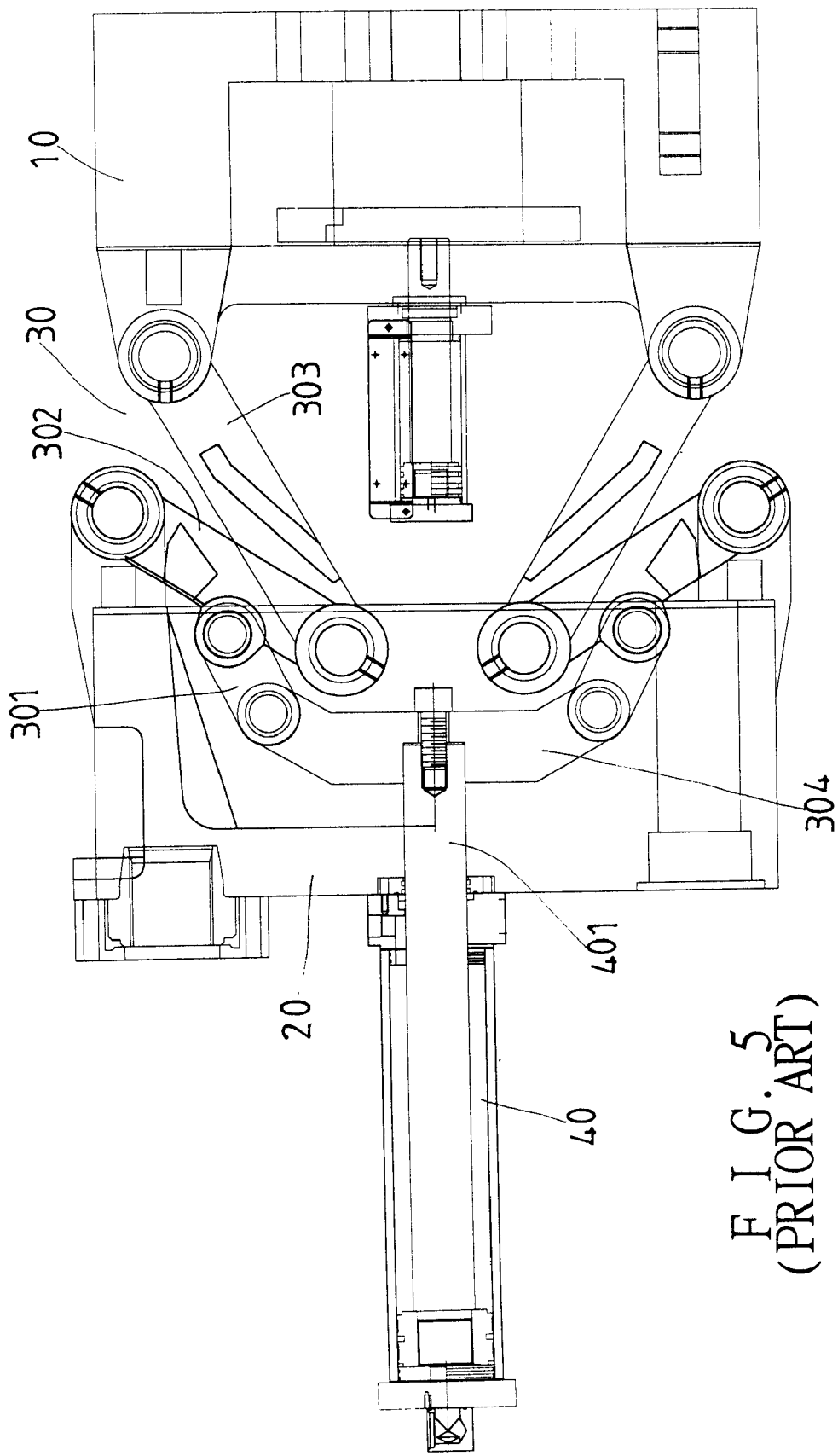
FIG. 5 is a front view of a known conventional arm structure for an injecting molding machine.

Next, as shown in FIG. 4, when the arm structure retreats in operation, it pushes the piston rod 41 of the oil pressure cylinder 4, forcing the oil pressure cylinder 4 itself to move backward to bring also the cross-shaped head 11 back and then the first arm 14 is pulled back, and further the second arm 12 and the third arm 13 as well as to move the movable mold base 3 backward. When the joints 5 of the second and the third arm 12 and 13 reach the lowest point (at the same time the lower second and the lower third arm 12 and 13 reach the highest point), the space 51 between the two joints 5 can pass the oil pressure cylinder 4, and continue to rotate to the lowest dead point, never colliding with the oil pressure cylinder 4 at all.

As understood from the above description, the space between the two joints 5 pivotally connecting the second and the third arms 12 and 13 is a little larger than the outer diameter of the oil pressure cylinder, so the arm structure completely never collides with the oil pressure cylinder 4 in moving back and forth. Thus, the whole length of an injecting molding machine becomes shorter, saving packaging and transporting cost and advantageous for planning and arranging a factory of the injecting molding machine, enhancing market competitiveness.

What is claimed is:

1. An arm structure for an injecting molding machine comprising a first arm, a second arm and a third arm, said second arm and said third arm consisting of plural pivotal plates and pivotally connected between plural fix plates of a receiving disc and a movable mold base, an oil pressure cylinder fixed in said arm structure to move said arm structure and then subsequently said movable mold base; characterized by said second arm having said two inner pivotal plates located separate from each other with a space larger than the outer diameter of said oil pressure cylinder, two joints pivotally connecting said two second arms and said two third arms separated with a space larger than an outer diameter of said oil pressure cylinder, thus said joints of said second and third arms never colliding with said oil pressure cylinder positioned between said receiving disc and said movable mold base when said arm structure operates to move back and forth.

* * * * *